(12) United States Patent
Fujita

(10) Patent No.: US 11,822,840 B2
(45) Date of Patent: Nov. 21, 2023

(54) INSPECTION APPARATUS CAPABLE OF PREVENTING UNNECESSARY ABNORMALITY DETERMINATION ON PRINTED MATTER, METHOD OF CONTROLLING THE SAME, AND STORAGE MEDIUM

(71) Applicant: CANON KABUSHIKI KAISHA, Tokyo (JP)

(72) Inventor: Ryo Fujita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/939,044

(22) Filed: Sep. 7, 2022

(65) Prior Publication Data

US 2023/0074128 A1    Mar. 9, 2023

(30) Foreign Application Priority Data

Sep. 9, 2021    (JP) .................................. 2021-146967

(51) Int. Cl.
*G06F 3/12* (2006.01)
*G06T 7/00* (2017.01)

(52) U.S. Cl.
CPC ............ *G06F 3/1256* (2013.01); *G06F 3/121* (2013.01); *G06F 3/1208* (2013.01); *G06T 7/001* (2013.01); *G06T 2200/24* (2013.01); *G06T 2207/30144* (2013.01)

(58) Field of Classification Search
CPC ...... G06F 3/1256; G06F 3/1208; G06F 3/121; G06F 3/1285; G06T 7/001; G06T 2200/24; G06T 2207/30144; G06T 7/0002
USPC ......................................................... 358/1.14
See application file for complete search history.

(56) References Cited

U.S. PATENT DOCUMENTS

| 8,009,833 B2 * | 8/2011 | Uchikawa ............ G06F 21/6209 713/172 |
| 2021/0072933 A1 * | 3/2021 | Yasaki .................. G06F 3/1259 |

FOREIGN PATENT DOCUMENTS

JP        2021037736 A    3/2021

\* cited by examiner

*Primary Examiner* — Darryl V Dottin
(74) *Attorney, Agent, or Firm* — ROSSI, KIMMS & McDOWELL LLP

(57) ABSTRACT

An inspection apparatus that performs quality inspection on a printed matter printed by a printer using a reference image and a scanned image of the printed matter. When inspecting the quality of the printed matter, selection is performed as to which to use as the reference image, a pre-printed image for use in printing the printed matter, or the scanned image. In a case where a difference is detected as a result of comparison between the pre-printed image and the scanned image, a reference image selection screen including the pre-printed image and the scanned image is displayed. A user input is received concerning whether or not the detected difference is a defect. The reference image is selected based on the received user input.

10 Claims, 9 Drawing Sheets

INSPECTION APPARATUS CAPABLE OF PREVENTING UNNECESSARY ABNORMALITY DETERMINATION ON PRINTED MATTER, METHOD OF CONTROLLING THE SAME, AND STORAGE MEDIUM

BACKGROUND OF THE INVENTION

Field of the Invention

The present invention relates to an inspection apparatus, a method of controlling the same, and a storage medium, and more particularly to an inspection apparatus that inspects the quality of a printed matter printed by a printer and is capable of preventing unnecessary abnormality determination on the printed matter, a method of controlling the same, and a storage medium.

Description of the Related Art

There is known an inspection apparatus that inspects the quality of a printed matter using a scanned image of the printed matter printed by a printer (hereinafter referred to as inspection of a printed matter). The inspection apparatus is capable of detecting image defects, such as stain and print omission, and a defect in the quality of printing of characters, a barcode, and so forth, when inspecting a printed matter. As for the image defects and printing quality defect, in general, the type of a defect is detected, and a threshold value for detecting a defect can be set for each detected type. For example, a general inspection apparatus can set, with respect to a spot which can be a circular-shaped image defect, a diameter in mm as a threshold value for determining the spot as a defect, and set, with respect to a stripe which can be a stripe-shape image defect, a length in mm for determining the stripe as a defect.

For such printed matter inspection, a method is employed in which an image having no defect, referred to as a reference image, is set as an object for comparison, and a scanned image of a printed matter is compared with the reference image. This method is classified into two types: a method in which a scanned image of a printed matter printed in advance is set as the reference image (hereinafter referred to as the "scan inspection") and a method in which an image before printed, such as a RIP image, is set as the reference image (hereinafter referred to as the "RIP inspection").

In the scan inspection, first, one copy or several copies is/are printed based on a print job for inspection, and scanned images of the obtained printed matters are generated. Next, after confirming that these printed matters have no stain and no character error, the user sets the scanned images of these printed matters as the reference images. For example, top five copies of a print job for printing 1000 copies are printed, and after the user visually confirms the obtained printed matters, the scanned images of these printed matters are set as the reference images and are used for comparison when printing the remaining 995 copies. Thus, in the scan inspection, since the scanned images of the printed matters visually confirmed by the user are used as the reference images, it is secured that the reference images satisfy the print quality desired by the user, but the scan inspection has the disadvantage that it takes time to visually confirm the printed matters.

On the other hand, in the RIP inspection, a RIP image before printed is set as the reference image and used for comparison with a scanned image of a printed matter obtained by printing a print job for inspection. For example, a defect, such as stain or print omission, is not present in the RIP image but present in the printed matter, and hence in the RIP inspection, it is possible to perform the inspection with respect to the above-mentioned defects without user's visual confirmation on the reference image, and thereby increase the productivity. However, differences between the RIP image and the printed matter include ones which are not defects of the printed matter, but are caused by the performance of the printer. For example, when drawing a very thin line, called a fine line, the line is drawn in the RIP image as a line of 0.5 pt faithfully to the print data, but in the printed matter, this line sometimes becomes a line of 1 pt depending on the performance of the printer. Further, for example, a striped pattern referred to as moire, which is similar to a wavy pattern and is generated on a printed matter, is not present in the RIP image, but is often generated depending on the performance of the printer. The above-mentioned differences between the RIP image and the printed matter, generated due to the performance of the printer, cannot be overcome by the conventional RIP inspection, and cause the inspection apparatus to unnecessarily determine that there is an abnormality, as a result of the inspection on the printed matter.

On the other hand, as a method of preventing the inspection apparatus from unnecessarily determining that there is an abnormality, as a result of the inspection on a printed matter, Japanese Laid-Open Patent Publication (Kokai) No. 2021-37736 describes a technique for excluding, when performing the scan inspection, images having image defect part, such as attachment of paper powder, from candidate images of the reference image.

However, the method of preventing the inspection apparatus from unnecessarily determining that there is an abnormality, as a result of the inspection on a printed matter, described in Japanese Laid-Open Patent Publication (Kokai) No. 2021-37736, is a technique which can be used when the scan inspection is performed, but cannot be used when the RIP inspection is performed. This is because in the RIP inspection, since the RIP image as an image before printed is used as the reference image, the image defect part generated during printing performed by the printer cannot be detected with reference to the RIP image. Further, in the RIP inspection, even when the inspection target is a print job for printing a plurality of copies, one RIP image is set as the reference image for one page of the print job. Therefore, in a case where an RIP image of a predetermined page is inappropriate as the reference image, if this RIP image is excluded, the reference image of the predetermined page is lost.

SUMMARY OF THE INVENTION

The present invention provides an inspection apparatus that is capable of preventing unnecessary abnormality determination as a result of inspection on a printed matter when performing RIP inspection, a method of controlling the same, and a storage medium.

In a first aspect of the present invention, there is provided an inspection apparatus that performs quality inspection on a printed matter printed by a printer, using a reference image and a scanned image of the printed matter, including at least one processor, and a memory coupled to the at least one processor, the memory having instructions that, when executed by the processor, perform the operations as: a first acquisition unit configured to acquire the reference image, a second acquisition unit configured to acquire the scanned image, a selection unit configured to select, when inspecting the quality of the printed matter, which to use as the reference image, a pre-printed image for use in printing the printed matter, or the scanned image, and a user interface unit configured to display, in a case where a difference is detected as a result of comparison between the pre-printed image and the scanned image, a reference image selection screen including the pre-printed image and the scanned image, and receive a user input concerning whether or not the detected difference is a defect, wherein the selection unit selects the reference image based on a user input received by the user interface unit.

In a second aspect of the present invention, there is provided a method of controlling an inspection apparatus that performs quality inspection on a printed matter printed by a printer using a reference image and a scanned image of the printed matter, including acquiring the reference image, acquiring the scanned image, selecting, when inspecting the quality of the printed matter, which to use as the reference image, a pre-printed image for use in printing the printed matter, or the scanned image, and displaying, in a case where a difference is detected as a result of comparison between the pre-printed image and the scanned image, a reference image selection screen including the pre-printed image and the scanned image, and receiving a user input concerning whether or not the detected difference is a defect, wherein said selecting includes selecting the reference image based on a received user input.

According to the present invention, it is possible to prevent unnecessary abnormality determination as a result of inspection on a printed matter when performing RIP inspection.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

An embodiment of the present invention will now be described below with reference to the accompanying drawings. Note that the present invention can be applied to an inspection apparatus used singly and an inspection apparatus formed by a plurality of apparatuses insofar as the function according to the present invention can be realized, unless otherwise specified. Further, the present invention can be applied to an inspection apparatus connected via a network, such as a LAN or WAN, to perform processing insofar as the function of the present invention can be realized, unless otherwise specified. That is, the system configuration in which a variety of terminals, described in the following embodiment, are connected is described by way of example, but a variety of system configuration can be employed according to uses and purposes.

Figure 1:
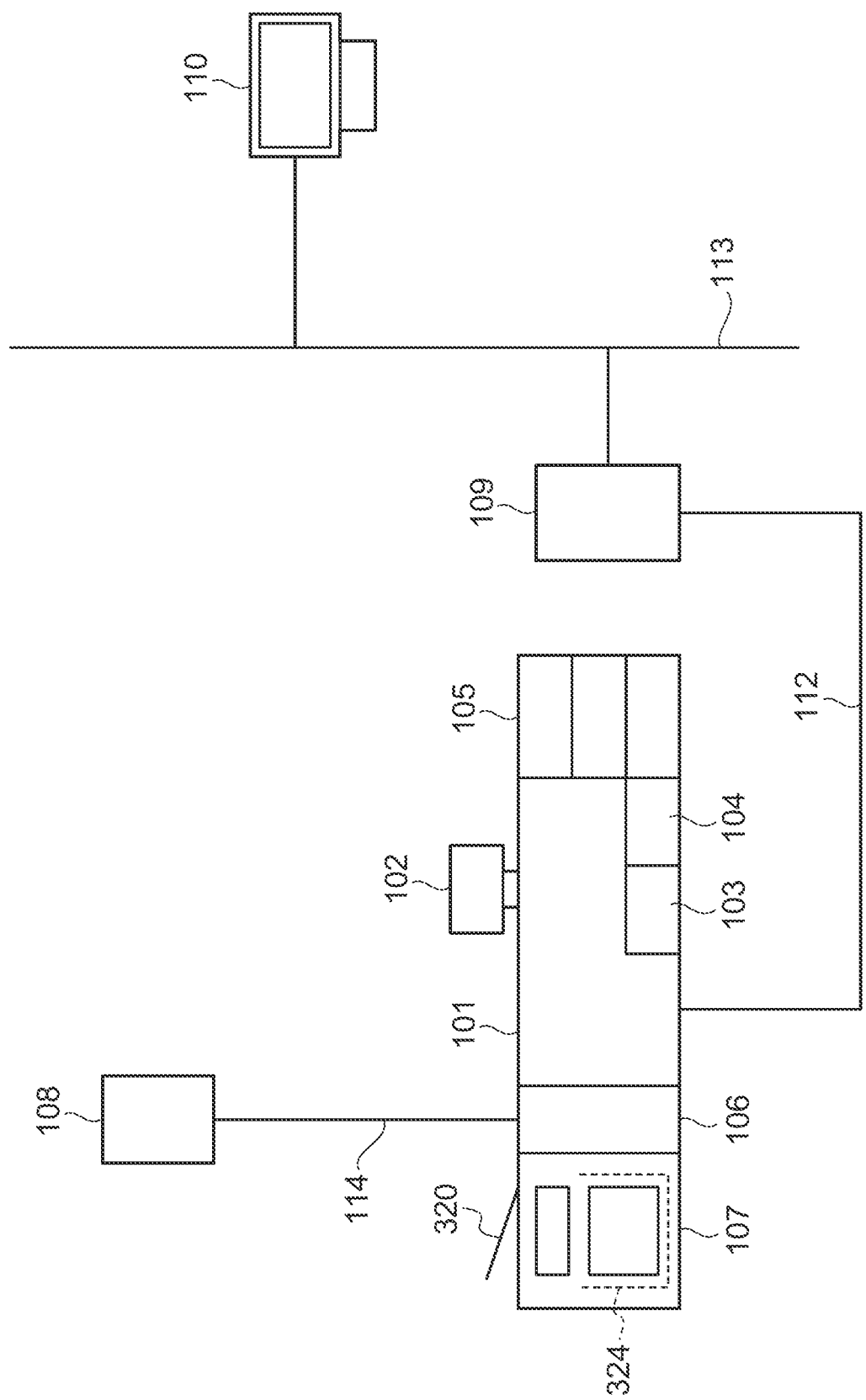
FIG. 1 is a schematic diagram of an inspection system including an inspection apparatus according to an embodiment of the present invention.

FIG. 1 is a schematic diagram of an inspection system including an inspection apparatus 108 according to the present embodiment.

Referring to FIG. 1, the inspection system includes an information processing apparatus 109, the inspection apparatus 108, a printer 101, and a client computer 110. Note that although in the present embodiment, a case where the printer 101 is a printer based on an electrophotographic method will be described, the printer 101 may be a printer using a different image formation method, such as an inkjet method and an offset method.

The printer 101 is connected to the information processing apparatus 109 via a cable 112.

The information processing apparatus 109 is connected to the client computer 110 via a network 113.

The printer 101 includes a UI panel 102, a sheet feed deck 103, and a sheet feed deck 104. Further, to the printer 101, an option deck 105 formed by three sheet decks is connected. Note that although in the present embodiment, the UI panel 102 is e.g. a user interface having an electrostatic capacitance-type touch panel, the UI panel 102 is not limited to this insofar as it is a user interface including a display section and an operation section on which a user can perform an input operation.

Further, the printer 101 includes an inspection unit 106 and a large-capacity stacker 107.

The inspection unit 106 is connected to the inspection apparatus 108 via a cable 114.

The large-capacity stacker 107 includes a main tray 324 (not shown in FIG. 1) and a top tray 320, and several thousands of sheets can be stacked on the main tray 324 at one time. A sheet from which a defect is detected by the inspection apparatus 108 is discharged onto the top tray 320.

A print job is generated by the client computer 110, transmitted to the information processing apparatus 109 via the network 113, and managed by the information processing apparatus 109. Then, the print job is transmitted from the information processing apparatus 109 to the printer 101 via the cable 112, and the printer 101 performs printing on a sheet based on the received print job. Note that the print job may be generated and managed by the information processing apparatus 109, directly transmitted to the printer 101 via the cable 112, and managed by the printer 101.

Note that the client computer 110, the information processing apparatus 109, and the inspection apparatus 108 may be connected to the cable 112 and enabled to communicate with the printer 101, respectively. Further, the inspection apparatus 108 may also be connected to the information processing apparatus 109 and the client computer 110 via the network 113. That is, the connection form of the printer 101, the information processing apparatus 109, and the client computer 110 in the present embodiment is shown by way of example, but a variety of connection forms other than that in the present embodiment may be employed.

Further, to the printer 101, not only the inspection unit 106 and the large-capacity stacker 107, but also a finisher that is capable of performing stapling, a folding machine, a bookbinding machine, and so forth may be connected.

Figure 2:
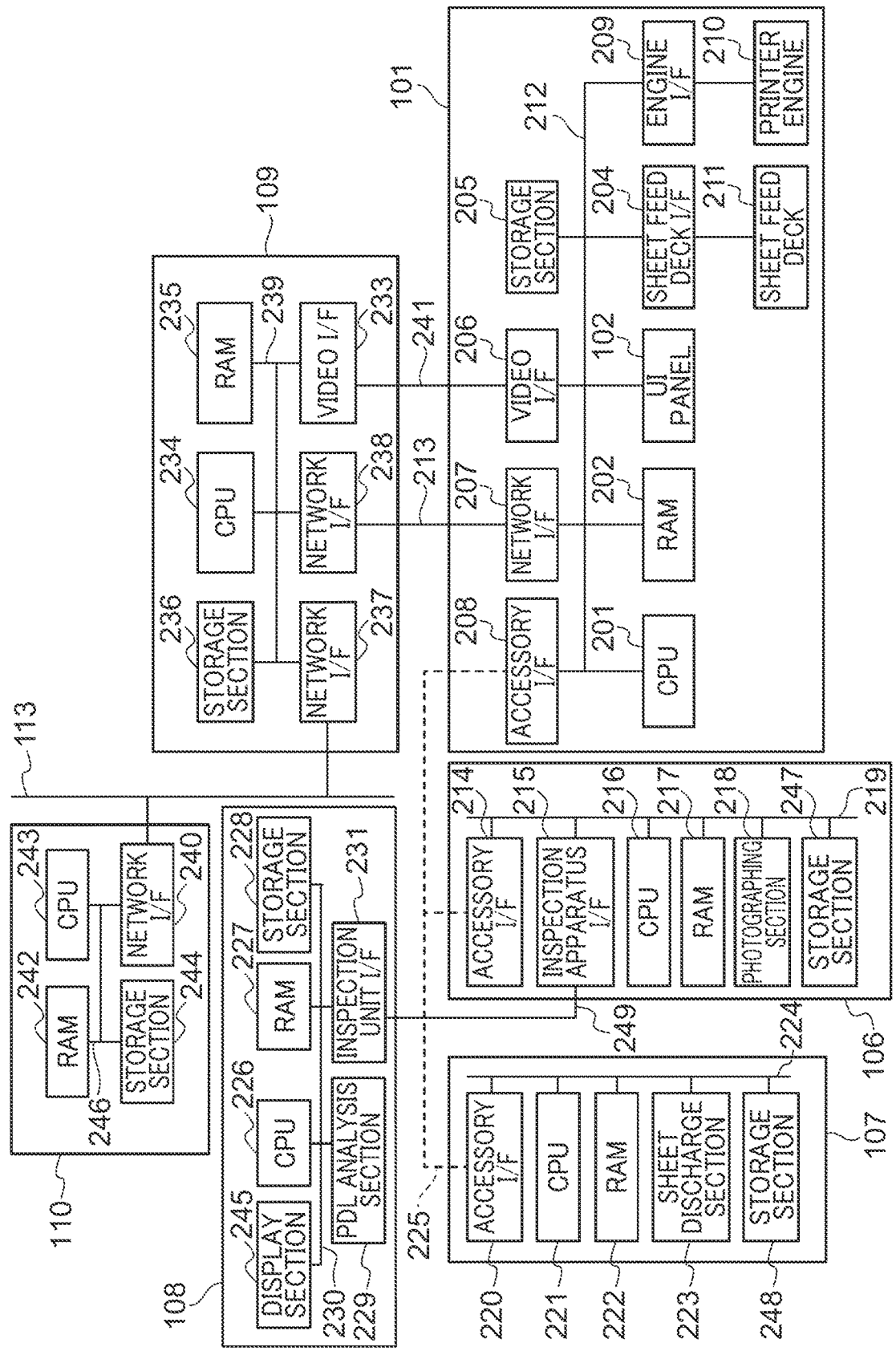
FIG. 2 is a block diagram showing the respective hardware configurations of a printer, the inspection apparatus, an inspection unit, a large-capacity stacker, an information processing apparatus, and a client computer.

FIG. 2 is a block diagram showing respective hardware configurations of the printer 101, the inspection apparatus 108, the inspection unit 106, the large-capacity stacker 107, the information processing apparatus 109, and the client computer 110.

The printer 101 includes a central processing unit (CPU) 201, a random access memory (RAM) 202, the UI panel 102, a sheet feed deck interface 204, a storage section 205, a video interface 206, a network interface (NW I/F) 207, an accessory interface 208, an engine interface 209, and a printer engine 210. The components of the printer 101 are interconnected via a system bus 212.

The CPU 201 performs control of and calculation for the components of the printer 101 via the system bus 212. The CPU 201 controls execution of programs which are stored in the storage section 205 and loaded into the RAM 202.

The RAM 202 is a type of a general volatile storage device which can be directly accessed from the CPU 201 and is used as a work area for the CPU 201 and an area for temporarily storing data.

The storage section 205 functions as a temporary storage area and a work memory when the printer 101 operates.

The engine interface 209 controls communication between the CPU 201 and the printer engine 210.

The sheet feed deck interface 204 controls communication between the CPU 201 and a sheet feed deck 211.

The sheet feed deck 211 collectively refers to the sheet feed deck 103, the sheet feed deck 104, and the option deck 105, appearing in FIG. 1.

The UI panel 102 is a user interface for performing the whole operation of the printer 101.

The network interface (NW I/F) 207 is connected to a network interface 238, referred to hereinafter, of the information processing apparatus 109 via a cable 213 and is responsible for communication between the information processing apparatus 109 and the printer 101. Note that although in the present embodiment, the network interfaces 207 and 238, as respective interfaces connected to the system bus 212 and a system bus 239, referred to hereinafter, are directly connected to each other, but for example, the network interfaces 207 and 238 may be connected e.g. via a network, and the connection form is not limited to this.

The video interface 206 is connected to a video interface 233, referred to hereinafter, via a video cable 241 and is responsible for communication of image data between the information processing apparatus 109 and the printer 101.

Note that the interface of the information processing apparatus 109 for connecting to the printer 101 may take a form in which the functions of the network interface 238 and the video interface 233 are integrated. Similarly, the interface of the printer 101 for connecting to the information processing apparatus 109 may take a form in which the functions of the network interface 207 and the video interface 206 are integrated.

The accessory interface 208 is connected to accessory interfaces 214 and 220, referred to hereinafter, via a cable 225. That is, the printer 101 intercommunicates with the inspection unit 106 and the large-capacity stacker 107 via the accessory interfaces 208, 214, and 220.

The inspection unit 106 includes the accessory interface 214, an inspection apparatus interface 215, a central processing unit (CPU) 216, a random access memory (RAM) 217, a photographing section 218, and a storage section 247. The components of the inspection unit 106 are interconnected via a system bus 219.

The CPU 216 performs control of and calculation for the components of the inspection unit 106 via the system bus 219, and controls execution of programs which are stored in the storage section 247 and loaded into the RAM 217.

The RAM 217 is a type of a general volatile storage device which can be directly accessed from the CPU 216 and is used as a work area for the CPU 216 and as an area for temporarily storing data.

The storage section 247 functions as a temporary storage area and a work memory when the inspection unit 106 operates.

The inspection apparatus interface 215 is connected to an inspection unit interface 231, referred to hereinafter, via a cable 249. That is, the inspection unit 106 communicates with the inspection apparatus 108 via the inspection apparatus interface 215 and the inspection unit interface 231.

The photographing section 218 has a photographing function equipped with e.g. a contact image sensor (hereinafter referred to as the CIS), generates a scanned image by photographing a sheet passing through the inspection unit 106, and transmits the scanned image to the inspection apparatus 108 via the inspection apparatus interface 215. Note that although in the present embodiment, a case will be described where the sensor installed for the photographing function of the photographing section 218 is the CIS, any other type of the sensor, such as a CCD image sensor, may be used, and the photographing method is not particularly limited. The image photographed by the photographing section 218 is transmitted to the inspection apparatus 108 for the following two purposes; One purpose is, irrespective of the inspection method, to photograph a printed matter of a print job for inspection, and transmit the photographed image to the inspection apparatus 108 to inspect the quality of the printed matter (hereinafter referred to as the "inspection of a printed matter"). The other purpose is, in a case where the inspection method is the scan inspection, to photograph one or a plurality of printed copies of a print job for inspection before executing the print job and transmit the photographed images to the inspection apparatus 108 as the reference images. The images photographed by the photographing section 218 and transmitted to the inspection apparatus 108 for the latter purpose are stored in a storage section 228, referred to hereinafter, as the reference images.

The large-capacity stacker 107 includes the accessory interface 220, a central processing unit (CPU) 221, a random access memory (RAM) 222, a sheet discharge section 223, and a storage section 248. The components of the large-capacity stacker 107 are interconnected via a system bus 224.

The CPU 221 performs control of and calculation for the components of the large-capacity stacker 107 via the system bus 224. The CPU 221 controls execution of programs which are stored in the storage section 248 and loaded into the RAM 222.

The RAM 222 is a type of a general volatile storage device which can be directly accessed from the CPU 221 and is used as a work area for the CPU 221 and as an area for temporarily storing data.

The storage section 248 functions as a temporary storage area and a work memory when the large-capacity stacker 107 operates.

The sheet discharge section 223 controls an operation of discharging a sheet to the main tray 324 and the top tray 320, referred to hereinafter, and monitoring of a stacked state of each of the main tray 324 and the top tray 320.

The inspection apparatus 108 includes a central processing unit (CPU) 226, a random access memory (RAM) 227, the storage section 228, a PDL analysis section 229, the inspection unit interface 231, and a display section 245. The components of the inspection apparatus 108 are interconnected via a system bus 230.

The CPU 226 performs control of and calculation for the components of the inspection apparatus 108 via the system bus 230, and controls execution of programs which are stored in the storage section 228 and loaded into the RAM 227.

The RAM 227 is a type of a general volatile storage device which can be directly accessed from the CPU 226 and is used as a work area for the CPU 226 and as an area for temporarily storing data.

The storage section 228 functions as a temporary storage area and a work memory when the inspection apparatus 108 operates.

The PDL analysis section 229 reads PDL data, such as PDF, PostScript, and PCL, received from the client computer 110 or the information processing apparatus 109 via the printer 101 and the inspection unit 106, and executes analysis processing.

The display section 245 (UI unit) is e.g. a liquid crystal display connected to the inspection apparatus 108, receives an input of a user to the inspection apparatus 108, and displays a state of the inspection apparatus 108.

The information processing apparatus 109 includes the video interface 233, a central processing unit (CPU) 234, a random access memory (RAM) 235, a storage section 236, a network interface 237, and the network interface 238. The components of the information processing apparatus 109 are interconnected via the system bus 239.

The CPU 234 performs control of and calculation for the components of the information processing apparatus 109 via the system bus 239, and controls execution of programs which are stored in the storage section 236 and loaded into the RAM 235.

The RAM 235 is a type of a general volatile storage device which can be directly accessed from the CPU 234 and is used as a work area for the CPU 234 and as an area for temporarily storing data.

The storage section 236 functions as a temporary storage area and a work memory when the information processing apparatus 109 operates.

The network interface 237 is connected to a network interface 240 via the network 113. Further, the information processing apparatus 109 communicates with the client computer 110 via the network interfaces 237 and 240.

Further, the inspection apparatus 108 may have a network interface, and the information processing apparatus 109 may communicate with the inspection apparatus 108 via this network interface and the network interface 237. For example, let us consider a case where the RIP inspection is used as the inspection method, and an image before printed by the printer 101, such as a RIP image (pre-printed image), is used as a reference image. In this case, the reference image may be transmitted to the inspection apparatus 108 via the inspection apparatus interface 215 or transmitted from the network interface included in the inspection apparatus 108 to the inspection apparatus 108 via the network interfaces 207 and 237. Note that although in the present embodiment, the RIP image generated by the printer 101 for printing is used as the reference image used for the RIP inspection, a RIP image generated by a RIP apparatus other than the printer 101, such as an apparatus in which RIP software has been installed, may be used.

The client computer 110 includes the network interface 240, a central processing unit (CPU) 243, a random access memory (RAM) 242, and a storage section 244. The components of the client computer 110 are interconnected via a system bus 246.

The CPU 243 performs control of and calculation for the components of the client computer 110 via the system bus 246 and controls execution of programs which are stored in the storage section 244 and loaded into the RAM 242.

The RAM 242 is a type of a general volatile storage device which can be directly accessed from the CPU 243 and is used as a work area for the CPU 243 and as an area for temporarily storing data.

The storage section 244 functions as a temporary storage area and a work memory when the client computer 110 operates.

Figure 3:
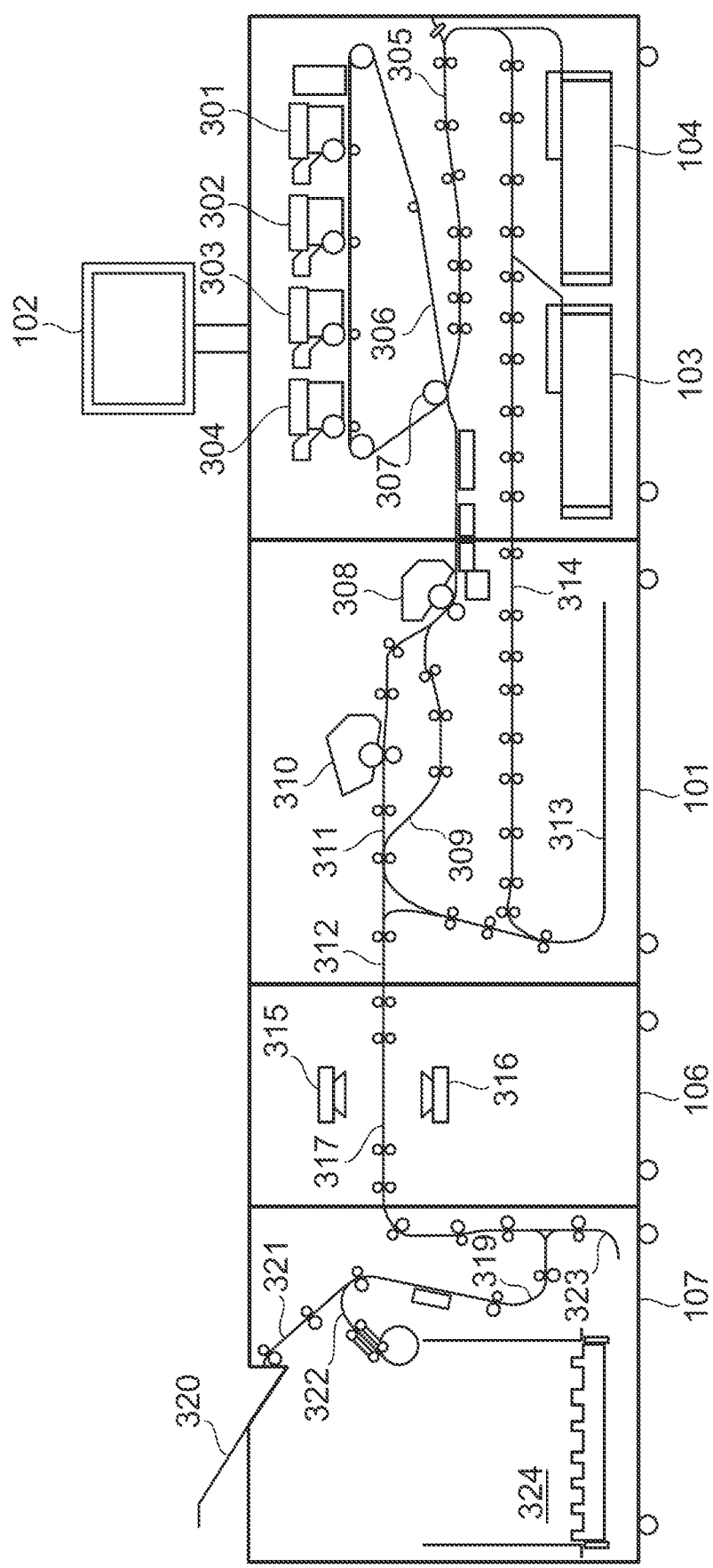
FIG. 3 is a view showing the respective internal configurations of the printer, the inspection unit, and the large-capacity stacker.

FIG. 3 is a view showing the respective internal configurations of the printer 101, the inspection unit 106, and the large-capacity stacker 107.

The printer 101 includes, as described with reference to FIG. 1, the UI panel 102 and the sheet feed decks 103 and 104. Further, the printer 101 includes developing stations 301 to 304, sheet conveying paths 305, 309, 311, and 312, an intermediate transfer belt 306, a secondary fixing position 307, a fixing unit 308, a second fixing unit 310, a sheet inversion path 313, and a double-sided conveying path 314.

The UI panel 102 receives an input of a user and displays the status of the printer 101.

The sheet feed decks 103 and 104 are each capable of storing a variety of sheets and feeding sheets into the sheet conveying path 305.

The developing stations 301 to 304 form toner images using color toners of Y, M, C, and K to form toner images, respectively. The toner images formed here are primarily transferred onto the intermediate transfer belt 306 to form a toner image in full color.

The intermediate transfer belt 306 rotates in a clockwise direction as viewed in FIG. 3, and the toner image is secondarily transferred onto a sheet conveyed from the sheet conveying path 305, at the secondary transfer position 307.

The fixing unit 308 includes a pressure roller and a heating roller and fixes the toner image to the sheet by melting and pressing the toners as the sheet passes between these rollers. The sheet having passed through the fixing unit 308 is conveyed to the sheet conveying path 312 through the sheet conveying path 309. Note that depending on a sheet type, melting and pressing are further required in order to fix the toner image. In this case, the sheet having passed through the fixing unit 308 is conveyed to the second fixing unit 310 using the sheet conveying path 311 arranged above the sheet conveying path 309, additionally subjected to melting and pressing, and then conveyed to the sheet conveying path 312. Further, in a case where the image formation mode is set to a double-sided printing mode, the sheet having passed through the sheet conveying path 309 or 311 is conveyed to the sheet inversion path 313, inverted by the sheet inversion path 313, and then conveyed to the double-sided conveying path 314, whereafter an image is transferred onto the second side of the sheet at the secondary transfer position 307.

The inspection unit 106 has a sheet conveying path 317, and CISs 315 and 316, arranged therein, such that the CISs 315 and 316 are opposed to each other across the sheet conveying path 317.

The CIS 315 is a sensor for reading an upper surface of a sheet.

The CIS 316 is a sensor for reading a lower surface of a sheet.

The inspection unit 106 scans the sheet using the CISs 315 and 316 in timing in which the sheet conveyed along the sheet conveying path 317 reaches a predetermined position. The scanned images are transmitted to the inspection apparatus 108 via the inspection apparatus interface 215 and the inspection unit interface 231. The CPU 226 of the inspection apparatus 108 determines whether or not each image received from the inspection unit 106 has a defect and notifies the inspection unit 106 of a result of the determination via the inspection unit interface 231 and the inspection apparatus interface 215. The CPU 216 of the inspection unit 106 notifies the large-capacity stacker 107 of the determination result received from the inspection apparatus 108 via the accessory interfaces 214 and 220.

The large-capacity stacker 107 is a stacker that is capable of stacking a large amount of sheets and has sheet conveying paths 319, 321, and 322, the top tray 320, a reversing portion 323, and the main tray 324 as a tray for stacking sheets.

Sheets having passed through the inspection unit 106 enter the large-capacity stacker 107 through the sheet conveying path 319. The sheets are stacked on the main tray 324 from the sheet conveying path 319 through the sheet conveying path 322.

The CPU 221 of the large-capacity stacker 107 discharges a sheet, from which a defect has been detected by the inspection apparatus 108, onto the top tray 320. When discharging the sheet onto the top tray 320, the sheet is conveyed from the sheet conveying path 319 to the top tray 320 through the sheet conveying path 321. The reversing portion 323 is a conveying path for reversing a sheet and is used when a sheet is stacked on the main tray 324. In a case where the sheet is stacked on the main tray 324 such that the sheet stacked on the main tray 324 faces in the same direction as when the sheet is conveyed into the large-capacity stacker 107, the sheet is reversed once at the reversing portion 32. In a case where a sheet is conveyed to the top tray 320, the sheet is directly discharged without flipping the sheet when stacked, and hence the reversing operation is not performed at the reversing portion 323.

Figure 4A:
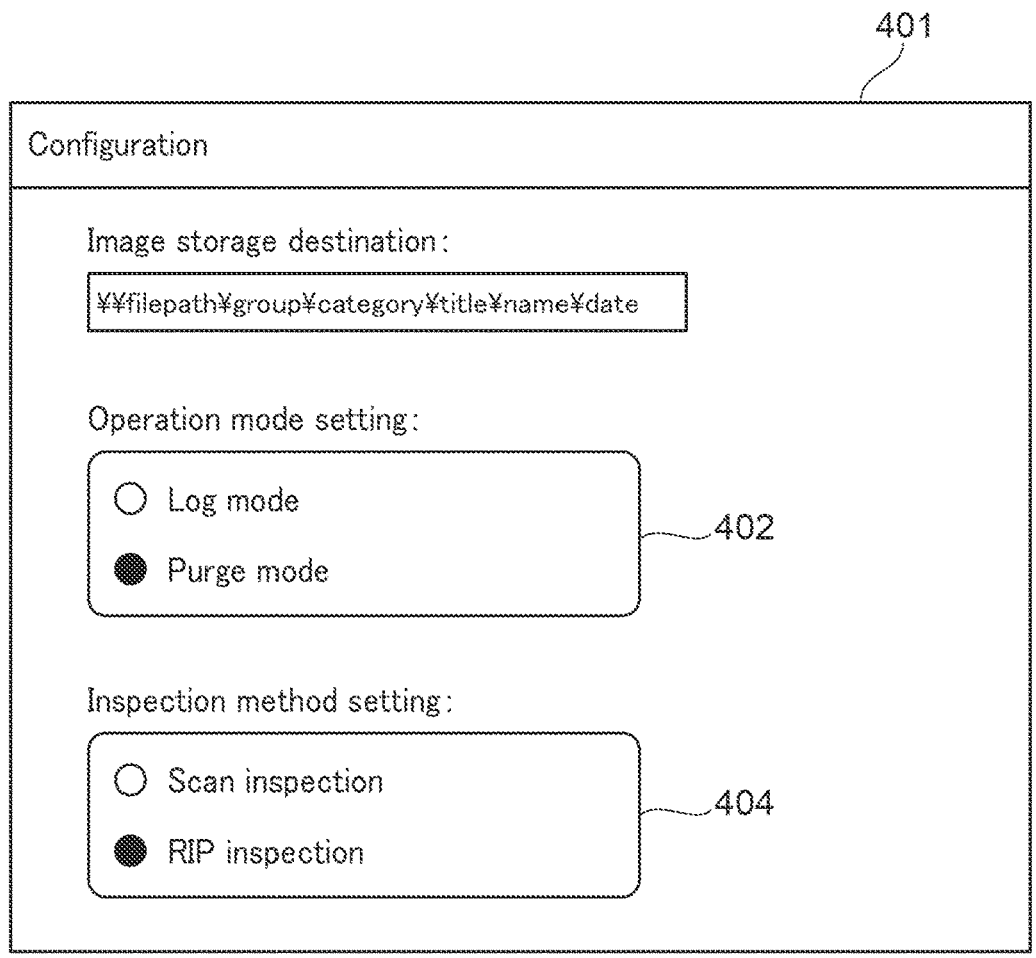
FIGS. 4A and 4B are views showing screens for configuring an operation mode of the inspection apparatus.

FIG. 4A shows a screen for setting an operation mode in the inspection apparatus 108.

The operation mode-setting screen, denoted by reference numeral 401, is displayed on the display section 245 of the inspection apparatus 108, for receiving an operation mode setting from a user, and includes an operation mode selection section 402 and an inspection method selection section 404.

The operation mode selection section 402 is used by the user to select one operation mode from a log mode and a purge mode. When the log mode is selected by the user on the operation mode selection section 402, the printer 101 discharges a sheet subjected to the inspection to a discharge destination specified by the property of a print job in advance regardless of a result of the inspection performed by the inspection apparatus 108. On the other hand, when the purge mode is selected by the user on the operation mode selection section 402, the printer 101 discharges a sheet determined as NG as a result of the inspection performed by the inspection apparatus 108 (hereinafter referred to as the "sheet of inspection result NG") onto the top tray 320.

The inspection method selection section 404 is used by the user to select one inspection method from scan inspection and RIP inspection. When the scan inspection is selected by the user on the inspection method selection section 404, the inspection apparatus 108 sets a scanned image of a printed matter as the reference image. On the other hand, when the RIP inspection is selected by the user, the inspection apparatus 108 sets an RIP image used by the printer 101 for printing, as the reference image. A process for generating and storing the reference image will be described with reference to a flowchart in FIG. 6.

Figure 4B:
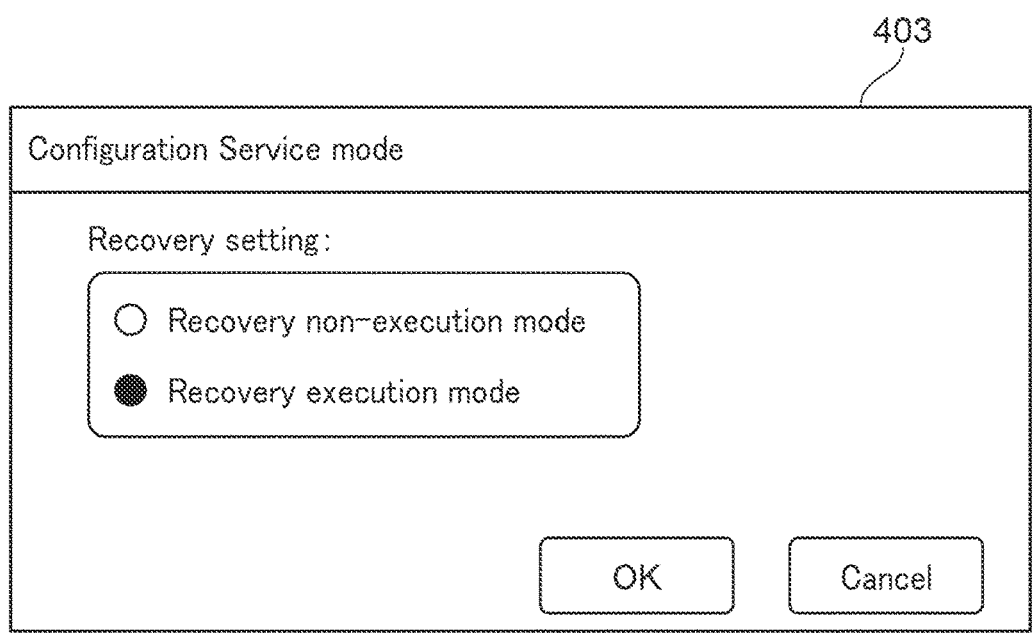

FIG. 4B shows a recovery setting screen of the purge mode in the inspection apparatus 108.

In a case where the purge mode is selected by the user on the operation mode selection section 402, a recovery mode setting set by the user on the recovery mode-setting screen, denoted by reference numeral 403, is reflected.

The recovery mode-setting screen 403 is displayed on the display section 245, for receiving one of a recovery non-execution mode and a recovery execution mode as the recovery mode setting from the user. In a case where the recovery non-execution mode is selected by the user on the recovery mode-setting screen 403, only a sheet determined as the sheet of inspection result NG is discharged onto the top tray 320. Further, the inspection apparatus 108 continues the same inspection with respect to the following sheets, and the printer 101 discharges only sheets each determined as the sheet of inspection result NG onto the top tray 320. On the other hand, in a case where the recovery execution mode is selected by the user on the recovery mode-setting screen 403, not only a sheet determined as the sheet of inspection result NG, but also the following sheets existing on any conveying paths appearing in FIG. 3 are all discharged onto the top tray 320. After that, when no sheet is left on any of the conveying paths appearing in FIG. 3, the printer 101 and the inspection apparatus 108 resume printing and inspection, starting with the image printed on the sheet determined as the sheet of inspection result NG.

The inspection apparatus 108 of the present embodiment photographs a sheet on which printing has been performed by the printer 101, and inspects an image printed on the sheet using the CISs 315 and 315 of the inspection unit 106. Therefore, when the inspection apparatus 108 determines one sheet as the sheet of inspection result NG, the following sheets may have already reached the sheet conveying paths 309, 311, and the like. However, unless all the following sheets in all of the conveying paths appearing in FIG. 3 are discharged, it is impossible to print the image printed on the sheet of inspection result NG, again, and stack the related sheets on the discharge destination specified by the print job in advance in the correct output order. Therefore, when in the recovery execution mode, the operation described above is executed.

The CPU 226 of the inspection apparatus 108 notifies the inspection unit 106 of the operation mode, the recovery mode, and the inspection method, which are set on the operation mode-setting screen 401 and the recovery mode-setting screen 403, via the inspection unit interface 231 and the inspection apparatus interface 215. Note that the operation mode, the recovery mode, and the inspection method, which are set on the operation mode-setting screen 401 and the recovery mode-setting screen 403, are stored in the RAM 227 by the CPU 226 of the inspection apparatus 108, and are stored in the RAM 217 by the CPU 216 of the inspection unit 106.

Figure 5:
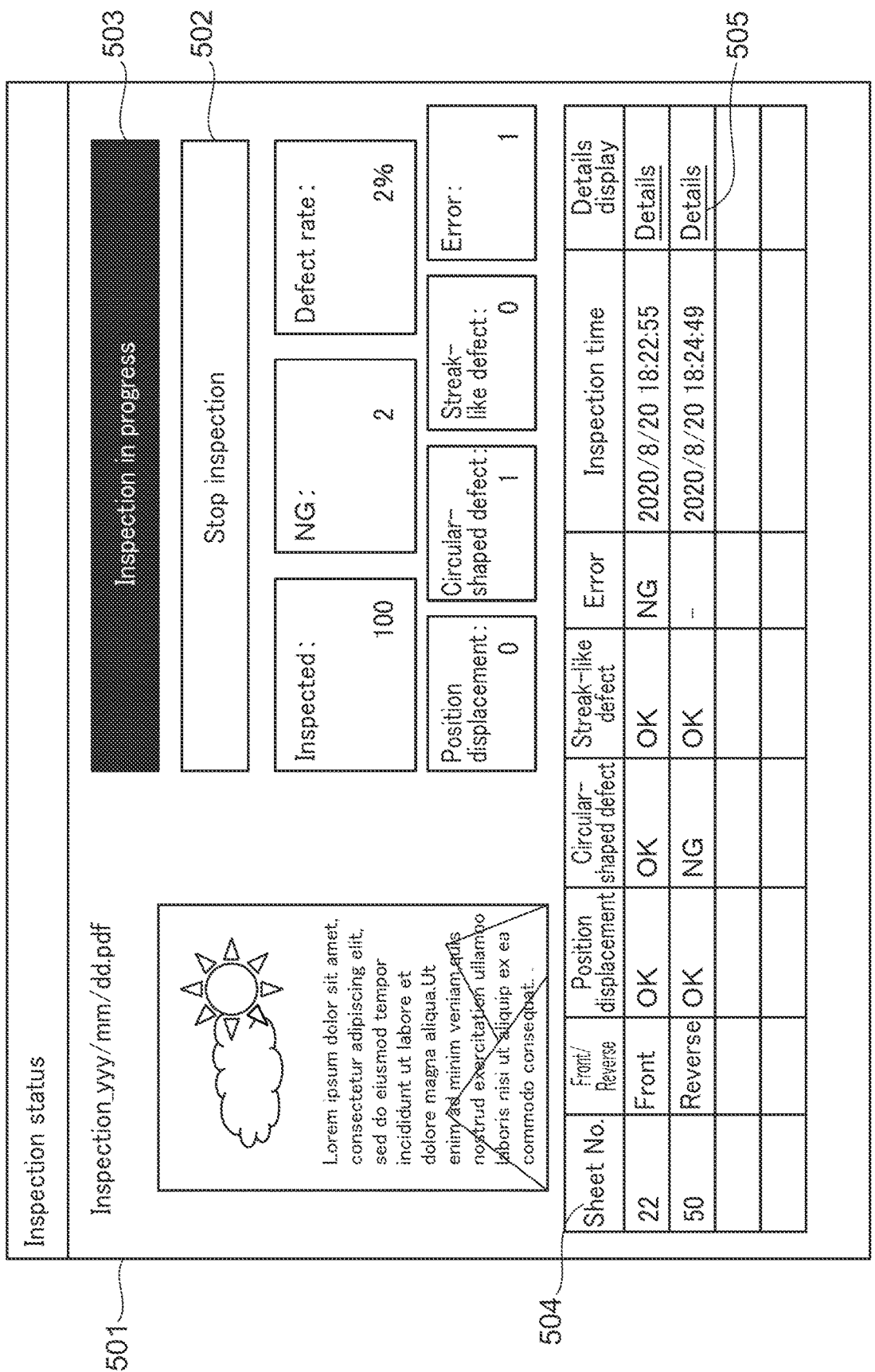
FIG. 5 is a view showing an inspection status screen displayed on a display section of the inspection apparatus when inspection is executed.

FIG. 5 shows an inspection status screen 501 displayed on the display section 245 of the inspection apparatus 108 when the inspection is executed.

The inspection status screen 501 is displayed on the display section 245 of the inspection apparatus 108, for receiving an instruction for executing/stopping the inspection from the user, and displaying the inspection status of the inspection apparatus 108.

The inspection status screen 501 displays an inspection button 502, an inspection status 503, and an inspection NG list 504.

The inspection button 502 receives an instruction for executing/stopping the inspection performed by the inspection apparatus 108 from the user. When the user presses the inspection button 502 displaying "Start inspection" to instruct execution of the inspection, the character string on the inspection button 502 is changed to "Stop inspection", and the inspection status 503 is changed to "Inspection in progress".

After that, when the user presses the inspection button 502 displaying "Stop inspection" to instruct stop of the inspection, the character string on the inspection button 502 is changed to "Start inspection", and the inspection status 503 is changed to "Under suspension".

Thus, the character string on the inspection button 502 and the inspection status 503 are toggled whenever the inspection button 502 is pressed.

The inspection status screen 501 further displays the number of inspected sheets, the number of sheets each determined as inspection result NG, a defect rate, and the number of times of occurrence of each cause of the inspection result NG on a real-time basis during the inspection. Note that the number of times of occurrence of "error" displayed as one of causes of the inspection result NG on the inspection status screen 501 is the number of sheets which are determined as an error by the inspection apparatus 108 due to time-out because the inspection has not been finished within a predetermined inspection time period and determined to be equivalent to inspection result NG.

To the inspection NG list 504, whenever inspection result NG occurs, there are added a sheet number indicating the feeding order of the sheet determined as inspection result NG, information indicating whether the printed side is a front side or a reverse side, a cause of the inspection result NG, an inspection time, and a link to an NG detail screen, referred to hereinafter.

When one of the links to the NG detail screen in the inspection NG list 504 (e.g. a link 505) is pressed, the display section 245 displays the NG detail screen (not shown). On the NG detail screen, there are displayed a scanned image of a sheet which was photographed by one of the CISs 315 and 316 and determined as inspection result NG, the position of a defect on the scanned image, and so froth.

Further, in the inspection NG list 504, as the causes of the inspection result NG, there are displayed position displacement, a circular-shaped defect (spot), a streak-like defect (streak), and an error.

The position displacement is a defect (cause of the inspection result NG) that whole or part of the image is displaced when a scanned image is compared with the reference image.

The circular-shaped defect is a defect (cause of the inspection result NG) referring to a state in which stain occurs in a circular shape only on the scanned image.

The streak-like defect is a defect (cause of the inspection result NG) referring to a state in which stain occurs in a streak-like or linear shape only on the scanned image.

The inspection apparatus 108 thus identifies a type of the detected defect based on features of each defect and displays the identified type on the inspection NG list 504.

Note that the defects displayed in the inspection NG list 504 as the causes of inspection result NG are only examples, and the types of the defect which can be detected by the inspection apparatus 108 are not limited to these. For example, when a state is detected in which an image is drawn only in the reference image, and all or part of the image is not drawn in the scanned image, the cause of the inspection result NG determined as image omission may be added to the inspection NG list 504.

Processes characterizing the present embodiment will be described below with reference to flowcharts, referred to hereinafter.

Figure 6:
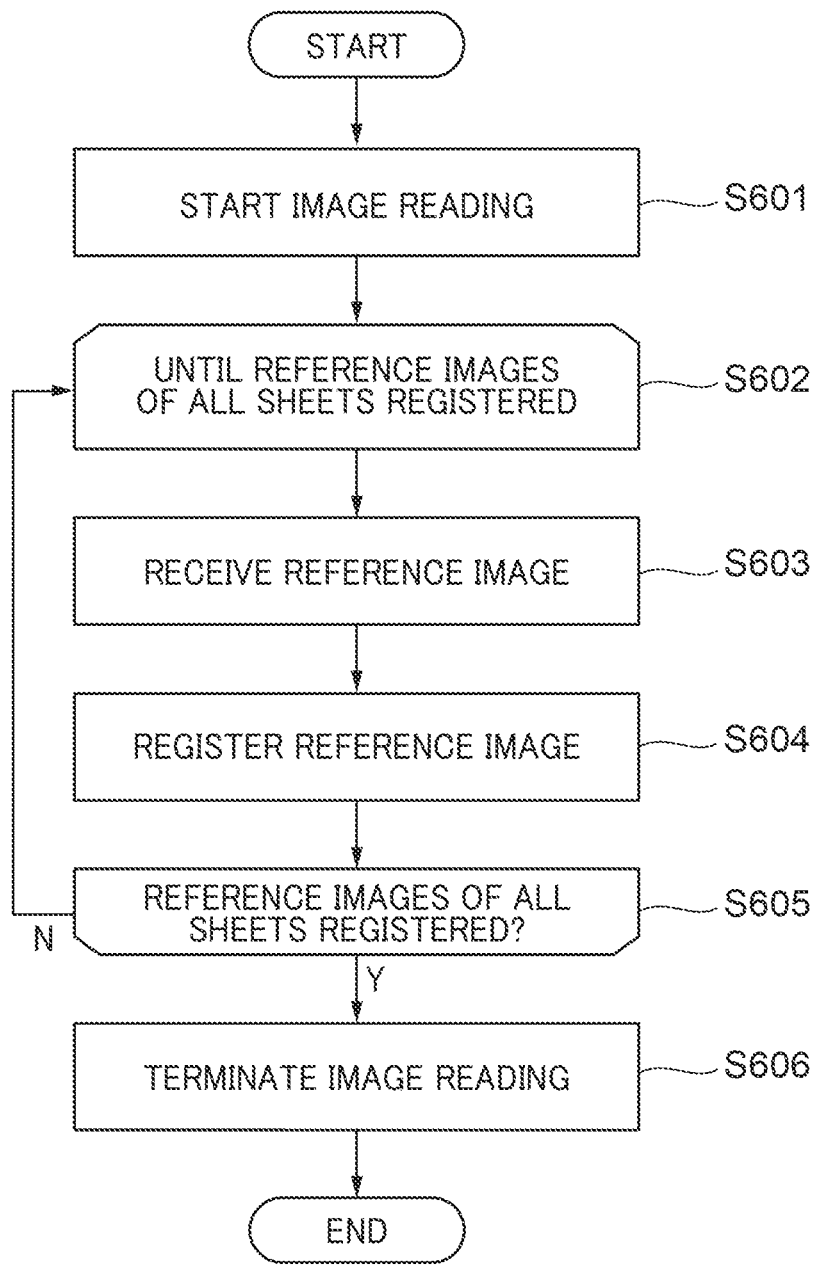
FIG. 6 is a flowchart of a reference image registration process performed by the inspection apparatus.

FIG. 6 is a flowchart of a reference image registration process performed by the inspection apparatus 108.

The inspection apparatus 108 stores a program of the present process in the storage section 228, the CPU 226 loads the same into the RAM 227, for execution.

As described above, if the inspection method is the scan inspection, the reference image is a scanned image of a printed matter, whereas if the inspection method is the RIP inspection, the reference image is an RIP image used by the printer 101 for printing. The reference image registration process in FIG. 6 is a process common to both of the scan inspection and the RIP inspection.

First, in a step S601, when the inspection button 502 on the display section 245 of the inspection apparatus 108 is pressed by the user, the CPU 226 starts image reading.

In a step S602, the CPU 226 repeats steps S603 and S604 until registration of the reference images of all sheets printed according to the print job is completed (S605).

In a step S603, in a case where the inspection method is the scan inspection, the CPU 226 receives the scanned images scanned by the CISs 315 and 316 via the inspection unit interface 231 and the inspection apparatus interface 215 as the reference images. On the other hand, in a case where the inspection method is the RIP inspection, the CPU 226 receives the RIP images generated by the printer 101 for printing from the inspection apparatus interface 215 as the reference images. Note that the inspection method set here is a method selected in the above-mentioned inspection method selection section 404 appearing in FIG. 4A.

In a step S604, the CPU 226 registers the reference images received in the step S603 in the RAM 227.

In the step S605, when registration of the reference images of all sheets is completed, the CPU 226 proceeds to a step S606, whereas if not, the CPU 226 returns to the step S603.

In the step S606, when the user presses the inspection button 502 on the display section 245 of the inspection apparatus 108, the CPU 226 terminates image reading, followed by terminating the present process.

Note that the reference image registration process in FIG. 6 is an example of the reference image registration process of the present invention.

For example, although in the step S601, image reading is started when the user presses the inspection button 502 on the display section 245, this is not limitative, but image reading may be started in the step S601 in accordance with a print start instruction provided by the user on one of the printer 101, the information processing apparatus 109, and the client computer 110.

Similarly, although in the step S606, image reading is terminated when the user presses the inspection button 502 on the display section 245, this is not limitative, but image reading may be terminated in the step S606, for example, in accordance with termination of printing by the printer 101.

Further, in a case where the inspection method is the scan inspection, for example, the inspection apparatus 108 may read a plurality of images with respect to the same page and register a result of combining the read images as a reference image.

Figure 7:
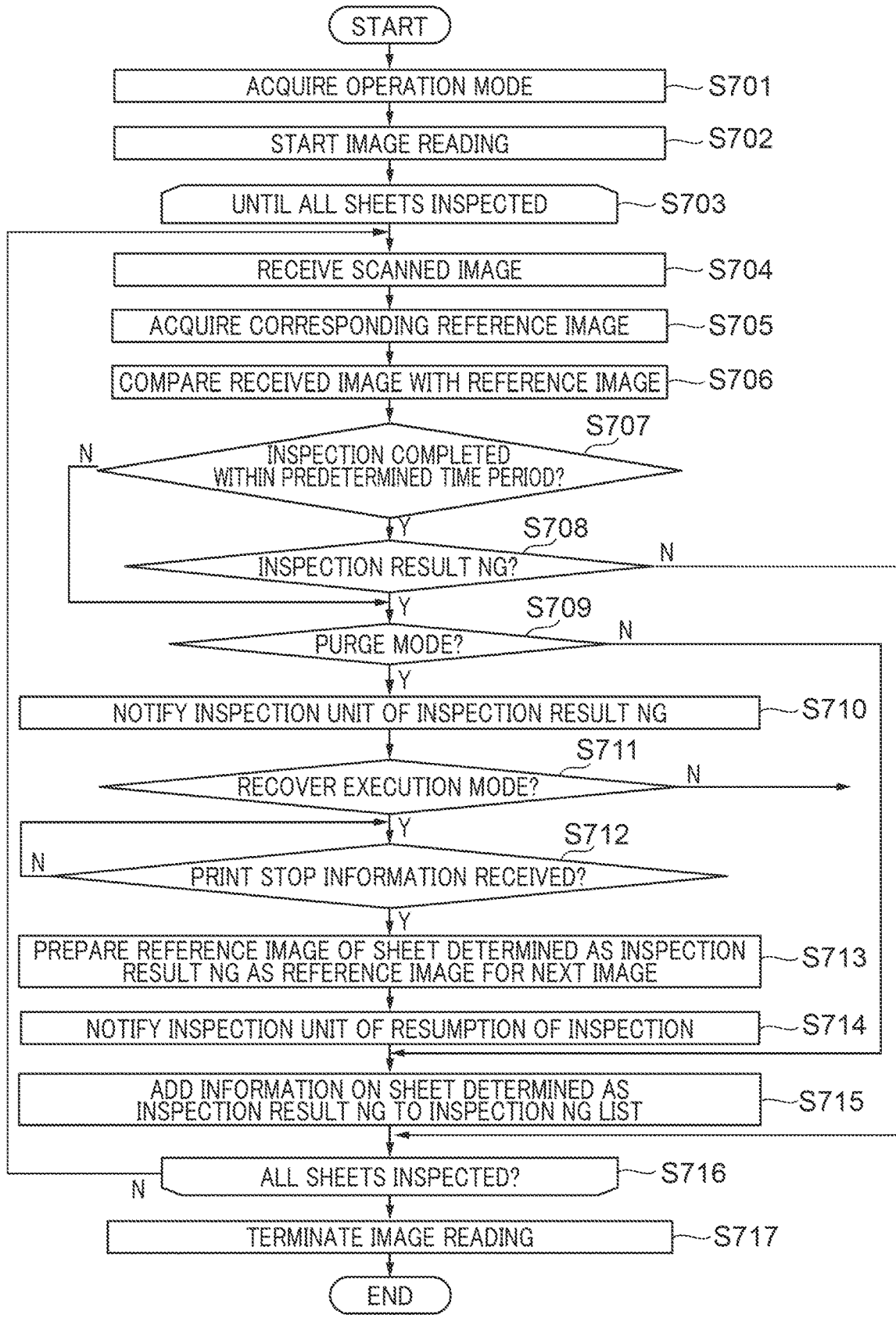
FIG. 7 is a flowchart of an inspection process performed by the inspection apparatus.

FIG. 7 is a flowchart of an inspection process performed by the inspection apparatus 108.

The inspection apparatus 108 stores a program of the present process in the storage section 228, and the CPU 226 loads the same into the RAM 227, for execution.

In a step S701, in a case where the operation mode selected by the user on the operation mode selection section 402 is the purge mode, the CPU 226 acquires the recovery mode setting selected by the user on the recover mode-setting screen 403. Further, the CPU 226 acquires the inspection method selected by the user on the inspection method selection section 404.

In a step S702, when the user presses the inspection button 502 on the display section 245 of the inspection apparatus 108, the CPU 226 starts image reading.

In a step S703, the CPU 226 repeats steps S704 to S715 until a step S716 wherein it is determined that the inspection on all sheets on which printing is performed by the print job is completed (until no sheet to be inspected is left).

In a step S704, the CPU 226 (second acquisition unit) receives an image scanned by the CISs 315 and 316 via the inspection unit interface 231 and the inspection apparatus interface 215. This image is a scanned image as the inspection target which has been obtained by scanning a print result of the print job, which is a deliverable, and the inspection apparatus 108 performs the inspection by comparing this scanned image and a corresponding one of the reference images registered by the reference image registration process in FIG. 6 in advance.

In a step S705, the CPU 226 reads out a reference image for the corresponding page, which has been registered in the step S604, from the RAM 227. Note that when the inspection method is the RIP inspection, there is a case where the reference images (correct answer images for the second and subsequent copies) are changed by a reference image selection process, described hereinafter with reference to FIG. 8. Therefore, printing of the top page of the second copy is executed after the reference image selection process is terminated with respect to all pages of the first copy and the correct answer images for the second and subsequent copies are finally determined.

In a step S706, the CPU 226 inspects a scanned image as the inspection target received in the step S704 using the reference image read in the step S705. Then, the CPU 226 determines whether or not a result of this inspection indicates that there is a difference between the reference image and the scanned image by comparison of these images. In this determination operation, first, the image positions are aligned between the reference image and a scanned image as the inspection target, by using feature points in both of the images as positioning reference points. Next, in the scanned image as the inspection target, four corners of the sheet and the positioning reference points of the scanned image are analyzed to detect whether or not there is positional displacement of the image with respect to the sheet. Next, the density value is compared between the reference image and the scanned image as the inspection target for each pixel. As a result of the above-mentioned determination operation, if it is determined that there is no difference between the scanned image as the inspection target and the reference image, inspection result OK is set (result of the inspection on the printed matter is set as no abnormality). On the other hand, if it is determined that there is a difference, the inspection result NG is set (result of the inspection on the printed matter is set as no abnormality), and details of the inspection result NG, described with reference to FIG. 5, are recorded according to the type of the defect. Note that, to explain the basic inspection operation here, the description is given of the case where the inspection method is the scan inspection in which inspection result NG is always set if it is determined that there is a difference. However, in a case where the inspection method is the RIP method, differently from the case where the inspection method is the scan inspection, even when it is determined that there is a difference, the inspection result NG is not always set. More specifically, in the RIP inspection performed during printing of the first copy, even when it is determined that there is a difference, in a case where the defect type cannot be identified and the magnitude of the difference is not within an acceptable range, the reference image selection process for replacing the reference image by the scanned image as the inspection target is executed by user selection. Details of the reference image selection process will be described hereinafter with reference to FIG. 8.

In a step S707, the CPU 226 determines whether or not the inspection has been completed within a predetermined time period. If it is determined that the inspection has been completed within the predetermined time period (YES to the step S707), the CPU 226 proceeds to a step S708, whereas if not (NO to the step S707), the CPU 226 proceeds to a step S709. This determination in the step S707 is executed because if it takes too much time to inspect one scanned image, the CPU 226 cannot inspect scanned images of the following sheets which are to be continuously transmitted. Further, this determination is executed also because when the purge mode is selected on the operation mode selection section 402, the CPU 221 switches the conveying destination to discharge a sheet determined as the sheet of inspection result NG by the inspection apparatus 108, to the top tray 320. That is, the CPU 226 is required to notify the CPU 221 of the inspection result NG before the sheet determined as the sheet of inspection result NG reaches a point where the CPU 221 cannot switch the sheet conveying destination in time.

Therefore, if the inspection has not been completed within the predetermined time period (NO to the step S707), the CPU 226 cannot determine that the inspection result of a scanned image as the inspection target OK, and hence the CPU 226 determines the inspection result is NG and proceeds to the step S709.

In the step S708, as a result of the comparison in the step S706, the CPU 226 determines whether or not the inspection result is NG. If it is determined that the inspection result is NG (YES to the step S708), the CPU 226 proceeds to the step S709, whereas if the inspection result is OK (NO to the step S708), the CPU 226 proceeds to a step S716.

In the step S709, the CPU 226 reads out the operation mode from the RAM 227 and determines whether or not the operation mode is the purge mode. If it is determined that the operation mode is the purge mode (YES to the step S709), the CPU 226 proceeds to a step S710, whereas if the operation mode is the log mode (NO to the step S709), the CPU 226 proceeds to a step S715.

In the step S710, the CPU 226 notifies the CPU 216 of the inspection result NG via the inspection unit interface 231 and the inspection apparatus interface 215.

In a step S711, the CPU 226 reads out the recovery mode setting from the RAM 227 and determines whether or not the read recovery mode setting is the recovery execution mode. If it is determined that the read recovery mode setting is the recovery execution mode (YES to the step S711), the CPU 226 proceeds to a step S712, whereas if the read recovery mode setting is the recovery non-execution mode (NO to the step S711), the CPU 226 proceeds to the step S715.

In the step S712, the CPU 226 waits until print stop information is received from the CPU 216 via the inspection unit interface 231 and the inspection apparatus interface 215. When the CPU 226 receives the print stop information (YES to the step S712), the CPU 226 proceeds to a step S713.

In the step S713, the CPU 226 reads out the reference image corresponding to the sheet determined as the sheet of inspection result NG from the RAM 227 and holds the read image as the reference image for an image to be inspected next.

In the step S714, the CPU 226 notifies the CPU 216 of the resumption of the inspection via the inspection unit interface 231 and the inspection apparatus interface 215.

In the step S715, the CPU 226 adds the information on the sheet determined as the sheet of inspection result NG to the inspection NG list 504.

In the step S716, if inspection of all sheets is completed, the CPU 226 proceeds to a step S717, whereas if not, the CPU 226 returns to the step S704.

In the step S717, when the user presses the inspection button 502 on the display section 245 of the inspection apparatus 108, the CPU 226 terminates image reading, followed by terminating the present process.

Note that the inspection process in FIG. 7 is an example of the inspection process of the present invention.

For example, although in the step S701, image reading is started when the user presses the inspection button 502 on the display section 245, this is not limitative. For example, image reading may be started in the step S701 in accordance with a print start instruction provided by the user on one of the printer 101, the information processing apparatus 109, and the client computer 110.

Similarly, although in the step S717, image reading is terminated when the user presses the inspection button 502 on the display section 245, this is not limitative. For example, image reading may be terminated in the step S717 in accordance with termination of printing in the printer 101.

Figure 8:
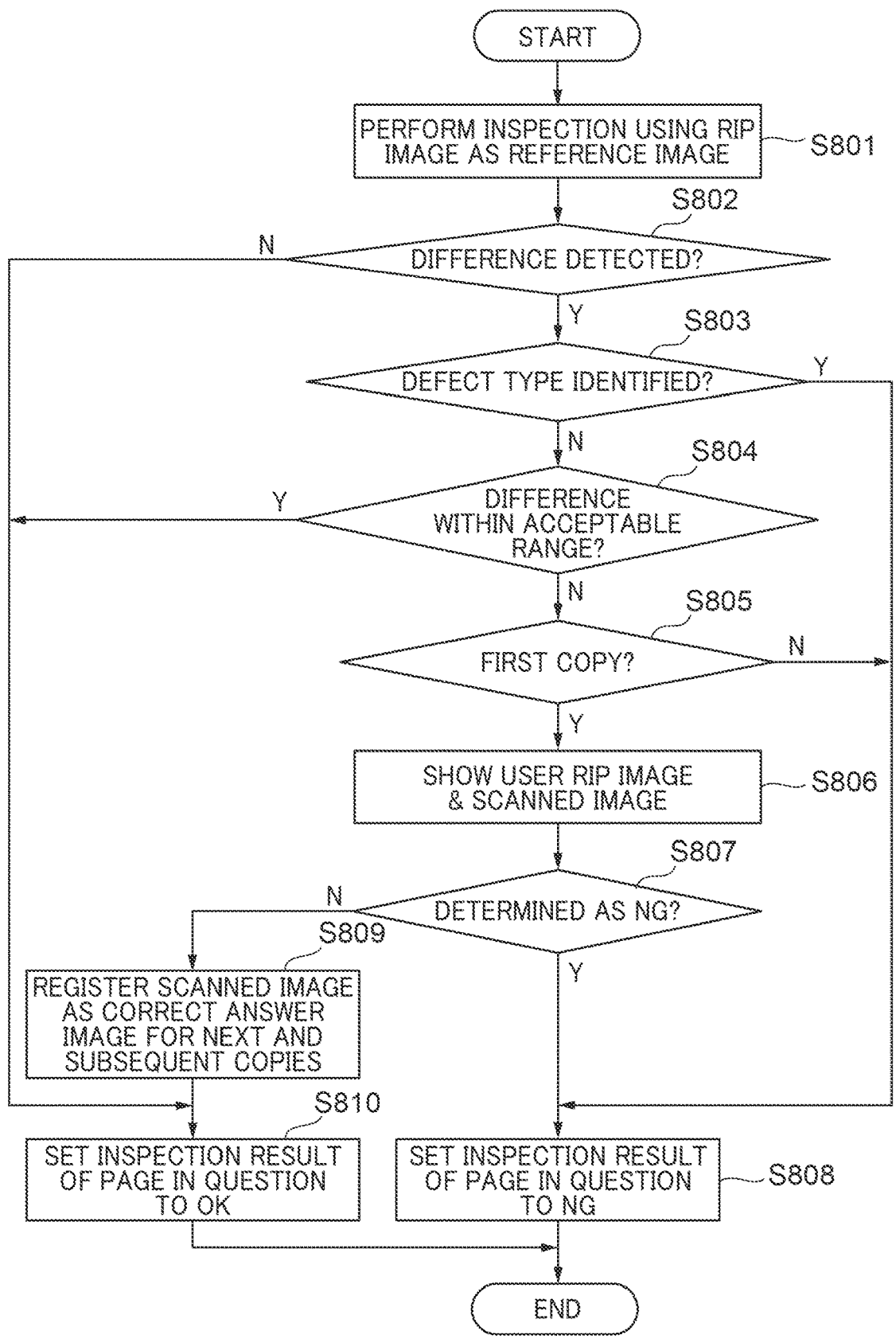
FIG. 8 is a flowchart of a reference image selection process performed in a step in FIG. 7 in a case where the inspection method is the RIP inspection.
Figure 9:
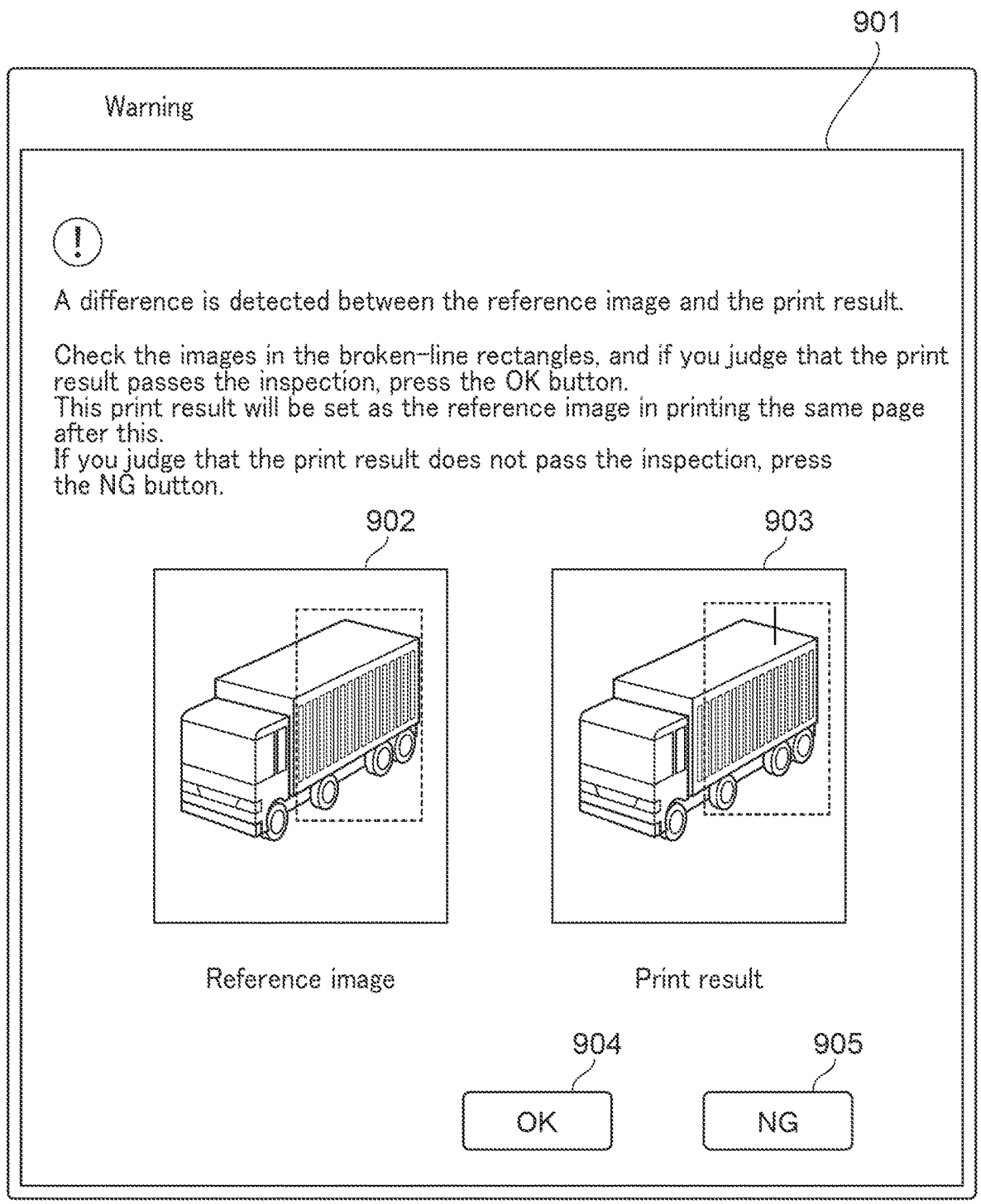
FIG. 9 is a diagram showing a reference image selection screen used in the reference image selection process in FIG. 8.

FIG. 8 is a flowchart of the reference image selection process performed in the step S706 in FIG. 7 in a case where the inspection method is the RIP inspection. Further, FIG. 9 is a diagram showing a reference image selection screen used in the reference image selection process in FIG. 8.

The inspection apparatus 108 stores a program of the present process in the storage section 228, and the CPU 226 loads the same into the RAM 227, for execution.

In a step S801, the CPU 226 inspects a scanned image of a print product using the RIP image as the reference image.

In a step S802, the CPU 226 determines whether or not a result of the inspection in the step S801 indicates that there is a difference between the reference image and the scanned image, i.e. there has been detected a difference therebetween by comparison thereof. This determination operation is the same as that described in the step S706 in FIG. 7. If it is determined in the step S802 that there is no difference (NO to the step S802), the CPU 226 proceeds to a step S810 and sets the inspection result to OK, followed by terminating the present process. On the other hand, if it is determined that there is a difference (YES to the step S802), the CPU 226 executes a step S803 et seq., which are characteristic processing operations in FIG. 8.

In the step S803, the CPU 226 determines whether or not the defect type of the detected difference could be identified. In the present embodiment, in a case where the detected defect corresponds to one of the position displacement, the circular-shaped defect, and the streak-like defect, described with reference to FIG. 5, it is determined that the defect type could be identified. If it is determined that the defect type could be identified (YES to the step S803), the CPU 226 proceeds to a step S808, and sets the inspection result of the corresponding page to NG, followed by terminating the present process. On the other hand, if the defect type could not be identified (NO to the step S803), the CPU 226 proceeds to a step S804.

In the step S804, the CPU 226 determines whether or not the magnitude of the detected difference is within an acceptable range. In the RIP inspection, since the RIP image as the reference image and the scanned image of the print product based on the RIP image are compared, a fine difference is sometimes generated e.g. due to contraction of a sheet or the like. However, in a case where this fine difference is accommodated within the acceptable range in which there is no influence on the quality of the print product, it is desirable to set the inspection result of the corresponding page to OK. Therefore, if the determined magnitude of the difference is within the acceptable range (YES to the step S804), the CPU 226 proceeds to the step S810, similarly to the case where it is determined in the step S802 that there is no difference, to set the inspection result to OK, followed by terminating the present process. More specifically, although the acceptable range in the present embodiment is "three pixels or less", the acceptable range can be set as desired according to the inspection apparatus 108. On the other hand, if the magnitude of the detected difference is outside the acceptable range (NO to the step S804), the CPU 226 proceeds to a step S805. Note that although in the present embodiment, the CPU 226 proceeds to the step 804 if it is determined that the defect type could not be identified (NO to the step S803), the processing order may be reversed. That is, if the magnitude of the detected difference is outside the acceptable range (NO to the step S804), the CPU 226 may proceed to the step S803.

In the step S805, the CPU 226 determines whether or not the page in question belongs to the first copy of the print product. If the page in question does not belong to the first copy (i.e. belongs to the second or subsequent copy) (NO to the step S805), the CPU 226 proceeds to the step S808, and sets the inspection result of the page in question to NG, followed by terminating the present process. On the other hand, if the page in question belongs to the first copy (YES to the step S805), the CPU 226 proceeds to a step S806.

In the step S806, the CPU 226 displays the reference image selection screen, denoted by reference numeral 901, in FIG. 9, including the RIP image which is the current reference image and the scanned image of the page in question, on the display section 245.

In a case where the inspection method is the RIP inspection, a difference between the reference image and the print result is sometimes not a defect, but a difference caused due to features of the printer 101, and the page in question is not necessarily the page of inspection result NG. Therefore, in the step S806, the reference image selection screen 901 is displayed to receive an instruction from the user, for determining whether or not the difference between the reference image and the print result is a defect.

As shown in FIG. 9, the reference image selection screen 901 (display unit/reception unit) has a display frame 902 of the RIP image which is the current reference image, a display frame 903 of the scanned image of the page in question, an OK button 904, and an NG button 905.

In each of the display frames 902 and 903, a place where the difference has been detected is indicated by a broken-line rectangle, for easy visual recognition.

Referring again to FIG. 8, in a step S807, the CPU 226 determines, based on a user operation performed on the reference image selection screen 901, whether or not the user has determined that the page in question is that of the sheet of inspection result NG. More specifically, the user compares the images displayed in the display frames 902 and 903, and if it is determined that the scanned image of the page in question, displayed in the display frame 903, satisfies the quality of the print product (printing is successful), the user presses the OK button 904. In a case where this user input has been performed on the reference image selection screen 901, the CPU 226 determines the page in question as that of the sheet of inspection result OK (NO to the step S807) and proceeds to a step S809. Examples in which the user performs this determination include a case where the reproduction property of a thin line is low, and a case where a moire image is generated due to the performance of the printer 101.

In the step S809, the CPU 226 (selection unit) selects and registers the scanned image of the page in question as the reference image (correct answer image for the second and subsequent copies). This is because it is desirable to use, even when there is a difference between the RIP image and the scanned image of the page in question, the scanned image of the page in question determined by the user that the quality of the print product is satisfied, as the reference image, when the subsequent copies are printed or the same job is reprinted later. Otherwise, the reference image selection screen 901 shown in FIG. 9 is displayed whenever the page in question is inspected during printing the subsequent copies or reprinting the print job, which impairs the convenience of the user. Therefore, in the present embodiment, the RIP image registered by the process in FIG. 6 is used as the reference image except a case where the scanned image of the page in question is registered as the reference image in the step S809.

Then, in the step S810, the CPU 226 sets the inspection result of the page in question to OK, followed by terminating the present process. With this, even in a case where the reproduction property of a thin line is low or a case where a moire image is generated due to performance of the printer 101, it is determined that there is no difference of the same type when the scanned image of the page in question is inspected the next time and thereafter.

On the other hand, in a case where the user determines that the scanned image of the page in question, displayed in the display frame 903 on the reference image selection screen 901, does not satisfy the quality of the print product, the user presses the NG button 905. In a case where this user input has been performed on the reference image selection screen 901, in the step S807, the CPU 226 determines that the page in question is determined as that of the sheet of inspection result NG and proceeds to the step S808.

In the step S808, the CPU 226 sets the inspection result on the page in question to NG, followed by terminating the present process. Examples in which the user performs this determination include a case where the reproduction property of a thin line is low, and a case where a moire image is generated due to the performance of the printer 101, and in these cases, the user determines that the scanned image of the page in question does not satisfy the quality of the print product. In this case, the user reconsiders the print setting or print data or performs adjustment of the printer 101 on an as needed basis. Further, as another example, a case is included where although a print defect has occurred, the defect type could not be identified in the step S803. For example, it is a case where a difference determined in the step S802 is stain on a print but satisfies neither a condition for determining the difference as a circular-shaped defect nor a condition for determining the difference as a streak-like defect.

As described above, according to the present embodiment, when the RIP inspection is performed, even when a difference is generated between a RIP image and a scanned image due to the performance of the printer 101, in a case where the user determines that the difference satisfies the quality of the print product, the reference image for the page in question is replaced by the scanned image. This makes it possible to prevent the inspection apparatus from unnecessarily determining the inspection result as NG. Further, it is possible to prevent the same difference from being detected in printing the subsequent copies or reprinting the same job, and thereby increase the productivity in inspection and printing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The processor or circuit can include a central processing unit (CPU), a micro processing unit (MPU), a graphics processing unit (GPU), an application specific integrated circuit (ASIC), and/or a field programmable gate array (FPGA). Further, the processor or circuit can include a digital signal processor (DSP), a data flow processor (DFP) and/or a neural processing unit (NPU).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-146967 filed Sep. 9, 2021, which is hereby incorporated by reference herein in its entirety.

What is claimed is:

1. An inspection apparatus that performs a quality inspection on a printed matter, printed by a printer, using a reference image and a scanned image of the printed matter, comprising:
   at least one processor; and
   a memory coupled to the at least one processor, the memory having instructions that, when executed by the at least one processor, perform operations as:
   a user interface unit configured to display, during the quality inspection for the printed matter of a first copy by using a pre-printed image for use in printing the printed matter as the reference image, in a case where a difference is detected as a result of a comparison between the pre-printed image, serving as the reference image, and the scanned image of the printed matter of the first copy, a reference image selection screen including the pre-printed image and the scanned image, and receive a user input determining whether or not the detected difference is a defect,
   wherein the quality inspection for the printed matter of second and subsequent copies to be printed by the printer is performed by using the scanned image of the printed matter of the first copy set as the reference image based on a user input received by the user interface unit.

2. The inspection apparatus according to claim 1, wherein the quality inspection for the printed matter of the second and subsequent copies to be printed by the printer is performed by using the scanned image of the printed matter of the first copy set as the reference image in a case where the received user input is a user input indicating that the detected difference is not a defect.

3. The inspection apparatus according to claim 2, wherein in a case where the scanned image of the printed matter of the first copy is set as the reference image for the second and subsequent copies to be printed by the printer, it is determined as a result of the quality inspection on the printed matter of the first copy that there is no abnormality.

4. The inspection apparatus according to claim 1, wherein in a case where the detected difference corresponds to a predetermined defect type, it is determined as a result of the quality inspection on the printed matter of the first copy that there is an abnormality, without displaying the reference image selection screen.

5. The inspection apparatus according to claim 1, wherein in a case where the magnitude of the detected difference is within a predetermined acceptable range, it is determined as a result of the quality inspection on the printed matter of the first copy that there is no abnormality, without displaying the reference image selection screen.

6. The inspection apparatus according to claim 1, wherein in a case where a difference is detected as a result of a comparison between the reference image and the scanned image of the printed matter of the n-th (n is greater than or equal to 2) copy during printing of the n-th copy by the printer, it is determined as a result of the quality inspection on the printed matter of the n-th copy that there is an abnormality, without displaying the reference image selection screen.

7. The inspection apparatus according to claim 1, wherein printing of a top page of the second copy by the printer is started when the quality inspection on the printed matter of the first copy is completed and the user input determining whether or not the detected difference is the defect has been received with respect to all pages of the first copy printed by the printer.

8. The inspection apparatus according to claim 1, wherein in a case where the quality inspection on the printed matter of the first copy is not completed within a predetermined time period, it is determined as a result of the quality inspection on the printed matter of the first copy that there is an abnormality.

9. A method of controlling an inspection apparatus that performs a quality inspection on a printed matter, printed by a printer, using a reference image and a scanned image of the printed matter, comprising:
   displaying, during the quality inspection for the printed matter of a first copy by using a pre-printed image for use in printing the printed matter as the reference image, in a case where a difference is detected as a result of a comparison between the pre-printed image, serving as the reference image, and the scanned image of the printed matter of the first copy, a reference image selection screen including the pre-printed image and the scanned image;
   receiving a user input determining whether or not the detected difference is a defect; and
   performing the quality inspection for the printed matter of second and subsequent copies to be printed by the printer by using the scanned image of the printed matter of the first copy set as the reference image based on a received user input.

10. A non-transitory computer-readable storage medium storing a program for causing a computer to execute a method of controlling an inspection apparatus that performs a quality inspection on a printed matter, printed by a printer, using a reference image and a scanned image of the printed matter,
   wherein the method comprises:
   displaying, during the quality inspection for the printed matter of a first copy by using a pre-printed image for use in printing the printed matter as the reference image, in a case where a difference is detected as a result of a comparison between the pre-printed image, serving as the reference image, and the scanned image of the printed matter of the first copy, a reference image selection screen including the pre-printed image and the scanned image;
   receiving a user input determining whether or not the detected difference is a defect; and
   performing the quality inspection for the printed matter of second and subsequent copies to be printed by the printer by using the scanned image of the printed matter of the first copy set as the reference image based on a received user input.

* * * * *